(12) United States Patent
Wong et al.

(10) Patent No.: US 8,148,860 B2
(45) Date of Patent: Apr. 3, 2012

(54) PMDC MOTOR

(75) Inventors: Ben To Fan Wong, Hong Kong (CN); Hong Wei Zhang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 208 days.

(21) Appl. No.: 12/689,871

(22) Filed: Jan. 19, 2010

(65) Prior Publication Data
US 2010/0181853 A1   Jul. 22, 2010

(30) Foreign Application Priority Data
Jan. 19, 2009   (CN) .......................... 2009 1 0105142

(51) Int. Cl.
*H02K 11/00*   (2006.01)
(52) U.S. Cl. ...................................... 310/68 R
(58) Field of Classification Search ............... 310/68 R, 310/68 B, 89, 88
See application file for complete search history.

(56) References Cited

U.S. PATENT DOCUMENTS

| | | | | |
|---|---|---|---|---|
| 5,565,721 | A * | 10/1996 | Knappe | 310/68 B |
| 5,723,924 | A * | 3/1998 | Blanchet | 310/85 |
| 6,677,693 | B2 * | 1/2004 | Ooyama | 310/239 |
| 6,922,003 | B2 * | 7/2005 | Uchida | 310/239 |
| 6,975,059 | B2 * | 12/2005 | Sakai et al. | 310/239 |
| 2002/0030414 | A1 * | 3/2002 | Mizutani et al. | 310/51 |

* cited by examiner

*Primary Examiner* — Nguyen N Hanh
(74) *Attorney, Agent, or Firm* — Muncy, Geissler, Olds & Lowe, PLLC

(57) ABSTRACT

A PMDC motor, particularly for driving an automobile liftgate, comprises a stator and a rotor rotatably mounted to the stator. The stator comprises a housing and an end cap mounted to one end of the housing. The end cap comprises: a first brush, a second brush, a first terminal, a second terminal, a first choke connected in series with the first brush and the first terminal, a second choke connected in series with the second brush and the second terminal, an overcurrent protection component connected in series with the second brush, and a set of capacitors. Each of the chokes comprises an inductor core extending axially and a winding wound about the inductor core.

5 Claims, 4 Drawing Sheets

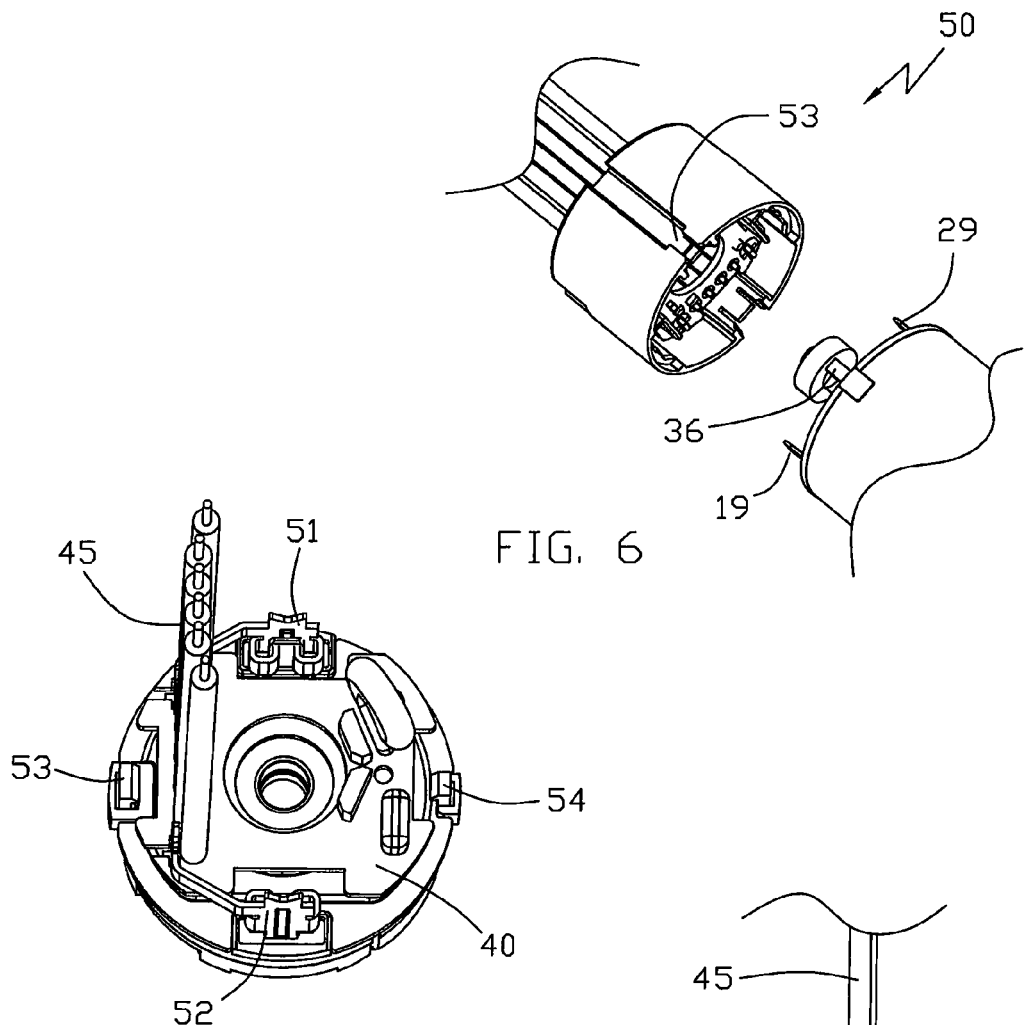

PMDC MOTOR

CROSS REFERENCE TO RELATED APPLICATIONS

This non-provisional patent application claims priority under 35 U.S.C. §119(a) from Patent Application No. 200910105142.3 filed in The People's Republic of China on Jan. 19, 2009.

FIELD OF THE INVENTION

This invention relates to a permanent magnet direct current (PMDC) commutator motor, especially such a motor for raising and lowering a liftgate of a vehicle.

BACKGROUND OF THE INVENTION

PMDC motors are well-known and have many uses. A PMDC motor generally comprises a stator and a rotor. The stator comprises a housing, permanent magnets fixed onto an inner surface of the housing and an end cap closing an open end of the housing. The rotor comprises: a shaft, a rotor core fixed onto the shaft, a commutator fixed onto the shaft adjacent one end of the rotor core and windings wound about teeth of the rotor core and terminated on segments of the commutator. The rotor is mounted with the rotor core confronting the permanent magnets and with the shaft rotatably supported by a bearing held by the end cap. Brushes are supported by one of the end caps. The brushes make sliding contact with the segments of the commutator to supply power to the windings.

FIG. 10 shows an end cap of a prior art PMDC motor. The end cap comprises two brushes 13 and 23, two chokes 15 and 25 and two terminals (only one terminal 19 is visible) for connecting to a power source. The brush 13, the choke 15 and the terminal 17 are connected in series. The brush 23, the choke 25 and the other terminal are connected in series. The brushes and the chokes are laid on an inner end surface of the end cap, resulting in that there is not enough space left for mounting other components such as electromagnetic compatibility (EMC) components and overcurrent protection components. One solution is to mount the EMC components and overcurrent protection components outside of the motor. However, performance of the components is reduced because the components are farther away from the armature windings.

Thus it is desirable to develop a small PMDC motor having an end cap that have enough space for mounting overcurrent protection component and/or other EMC components.

SUMMARY OF THE INVENTION

Accordingly, in one aspect thereof, the present invention provides a PMDC motor comprising a stator and a rotor rotatably mounted to the stator, the stator comprises a housing and an end cap mounted to one end of the housing, the end cap supporting, on an inner surface thereof, a first brush, a second brush, a first terminal, a second terminal, a first choke connected in series with the first brush and the first terminal, a second choke connected in series with the second brush and the second terminal, a set of capacitors electrically connected with the two terminals, and a PTC thermistor connected in series with the second terminal, wherein each of the two chokes comprise an inductor core extending axially and a winding wound about the inductor core.

Preferably, the rotor comprises: a shaft having a first end supported by a bearing held by the end cap; and a ring magnet mounted onto the first end of the shaft; and wherein a PCB is mounted adjacent to the end cap and at least one Hall sensor is mounted on the PCB and arranged to detect rotation of the ring magnet.

Preferably, an end cap cover forms a chamber with the end cap, and first and second legs formed on the end cap extend axially outwards to engage the end cap cover and the PCB is disposed within the chamber.

Preferably, barbs are formed at the distal ends of the first and second legs and anchors are formed on the end cap cover to engage the barbs.

Preferably, the two terminals axially penetrate the end cap and protrude through an outer surface of the end cap, the two terminals and the two legs being arranged alternately in a circumferential direction.

Preferably, two connectors are connected to the PCB and electrically connect the two terminals to a source of power for the motor.

Preferably, the set of capacitors comprises a first capacitor and a second capacitor, the first capacitor being electrically connected between the first terminal and the stator housing and the second capacitor being electrically connected between the second terminal and the stator housing.

Preferably, the set of capacitors comprises a third capacitor electrically connected between the first terminal and the second terminal.

Preferably, the end cap supports a diode, the positive side of the diode being connected to one of the first terminal and the second terminal which is to be connected to the negative pole of a power source, and the negative side of the diode being connected to the other one of the first terminal and the second terminal.

By implementing the present invention, chokes are mounted to the end cap with the inductor cores extending in a direction substantially parallel to the motor shaft creating space on the end cap for mounting other components such EMC components and/or overcurrent protection component.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

FIG. 6 is an exploded view of a part of the PMDC motor and its end cap cover;

FIG. 7 illustrates the end cap with the PCB positioned above;

FIG. 8 illustrates a part of the PMDC motor assembled with its end cap cover;

DETAILED DESCRIPTION OF THE PREFERRED EMBODIMENTS

Figure 1:
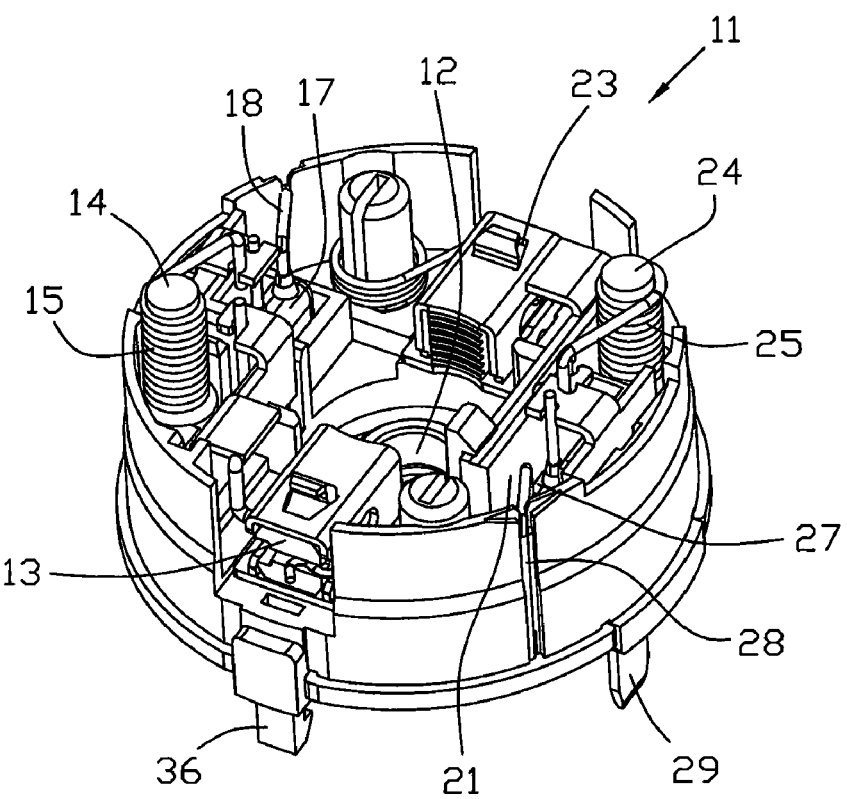
FIG. 1 and FIG. 2 illustrate an end cap of a PMDC motor according to a preferred embodiment of the present invention.
Figure 2:
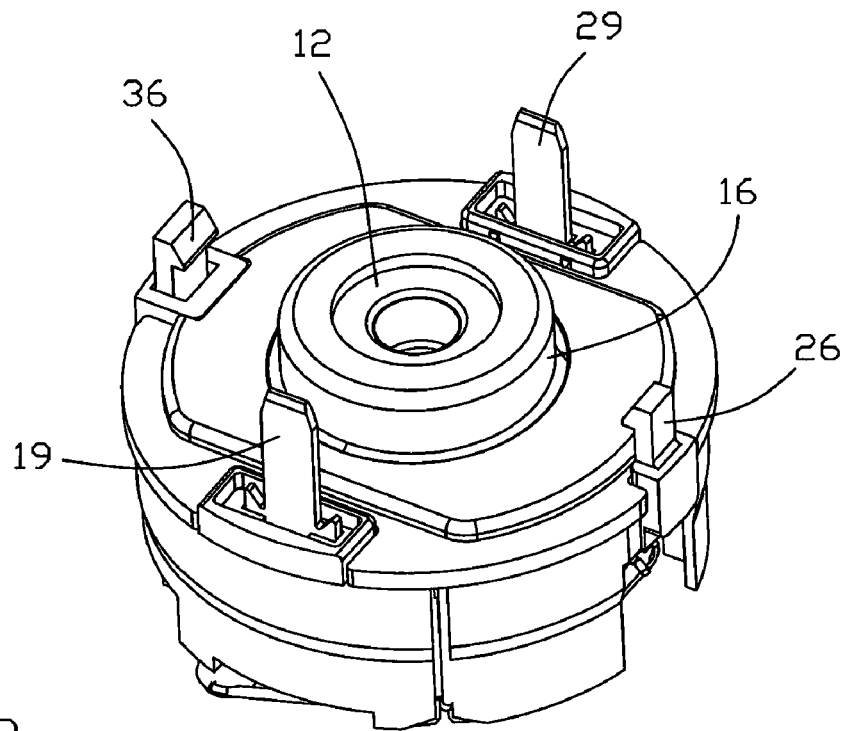

FIG. 1 and FIG. 2 illustrate an end cap of a PMDC motor according to the preferred embodiment of the present invention. The end cap 11 comprises: a bearing holder 16 for holding a bearing 12, a first brush 13 and a second brush 23 for sliding contact with a commutator (not shown), a first choke 15, a second choke 25, a first terminal 19, a second terminal 29, and a positive temperature coefficient (PTC) thermistor 21. The first brush 13, the first choke 15 and the first terminal 19 are connected in series, while the second brush 23, the second choke 25, the PTC thermistor 21 and the second terminal 29 are connected in series.

The end cap 11 also comprises a set of capacitors which includes a first capacitor 17 and a second capacitor 27. One lead of the first capacitor 17 is connected to the first terminal 19 and the other lead 18 of the first capacitor 17 is disposed at a circumferential surface of the end cap 11 so that the lead 18 will be electrically connected to the motor housing when the end cap 11 is press fitted to the motor housing which is electrically grounded. Similarly, one lead of the second capacitor 27 is connected to the second terminal 29 and the other lead 28 is disposed at a circumferential surface of the end cap 11 to be electrically connect with the motor housing when the end cap is fitted to the motor housing. The motor will have an improved electromagnetic compatibility (EMC) level because of the grounded capacitors.

In the present embodiment, the first brush 13 and second brush 23, the first choke 15 and second choke 25 are deposited on an inner axial end surface of the end cap. The first choke 15 comprises an inductor core 14 and a winding wound about the induction core. The second choke 25 comprises an inductor core 24 and a winding wound about the inductor core. Both of the inductor cores 14 and 24 extend along a direction substantially parallel to the motor shaft so that there is enough space available on the inner end surface of the end cap 11 for mounting the set of capacitors, the PTC thermistor 21, the brushes and the chokes. The first terminal 19 and the second terminal 29 extend axially through the end cap 11 and protrude through an outer end surface of the end cap 11 to connect to the power source. The PTC thermistor 21 is used to prevent overcurrent.

Optionally, a third capacitor (not shown) is provided to improve the EMC level. Two leads of the third capacitor are electrically connected to the first terminal 19 and the second terminal 29, respectively, so as to be connected directly between the two terminals. Furthermore, a diode (not shown) may be mounted on the end cap 11 with its positive side electrically connected to the terminal that is connected to negative pole of power source, and with its negative side electrically connected to the terminal that is connected to the positive pole of the power source.

Figure 3:
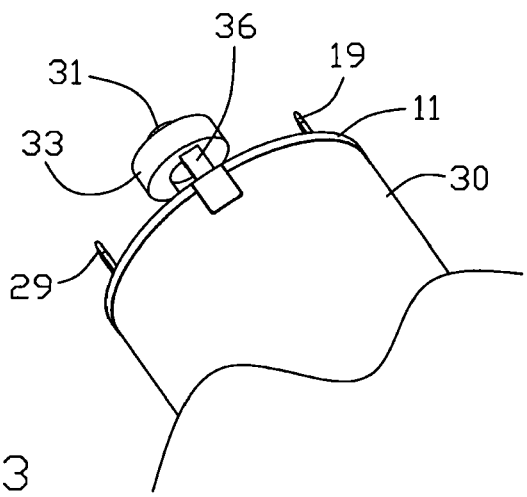
FIG. 3 is a partial view of a PMDC motor according to the preferred embodiment.

Referring to FIG. 3, the end cap 11 is fitted to one end of the motor housing 30. A first end of the rotor shaft 31 is rotatably supported by the bearing 12 held by the end cap 11. A ring magnet 33 is fixed onto the first end of the shaft 31 protruding from the end cap. The ring magnet 33 rotates with the shaft 31.

Figure 4:
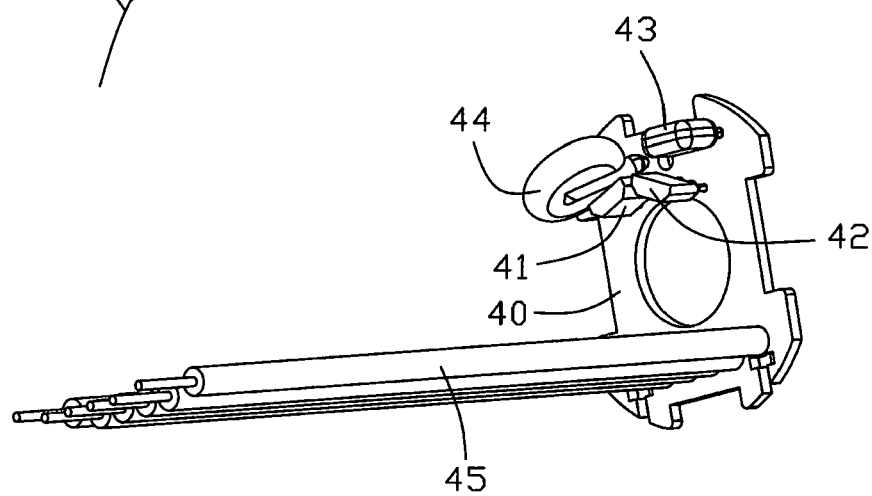
FIG. 4 illustrates a PCB and components mounted onto the PCB according to the preferred embodiment.
Figure 5:
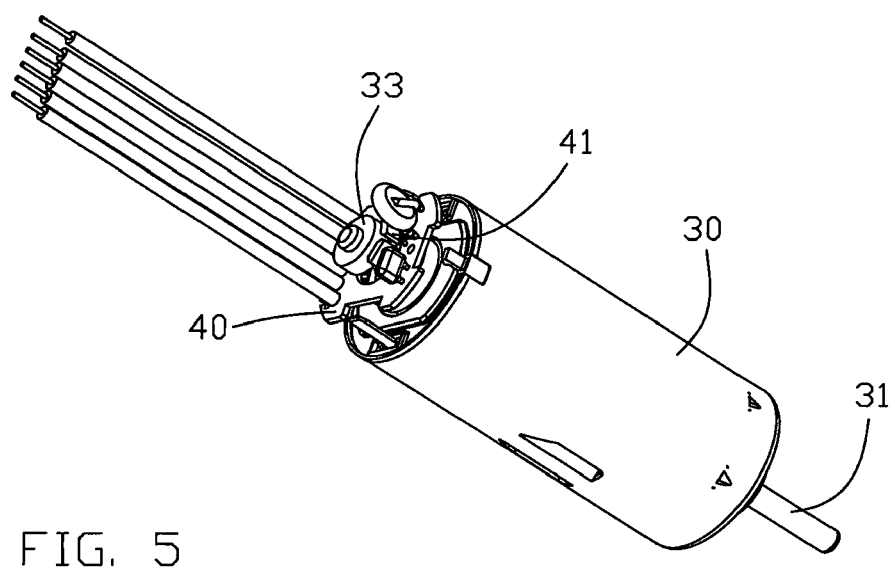
FIG. 5 illustrates the PMDC motor of FIG. 3 assembled with the PCB of FIG. 4.

Referring to FIG. 4 and FIG. 5, Hall sensors 41 and 42 are mounted to a printed circuit board (PCB) 40 to detect rotation of the ring magnet 33. Specifically, the PCB 40 has a hole through which the first end of rotor shaft extends to locate the ring magnet 33 adjacent to the Hall sensors 41 and 42. Other components such as a filter capacitor 43, a resistor 44 and wires 45 are also mounted to the PCB 40. The wires 45 carry signals from the Hall sensors to a motor controller and may include power leads for supplying power to the motor.

Referring to FIG. 6 to FIG. 8, the PCB 40 is mounted inside an end cap cover 50. The end cap cover 50 comprises a bottom and cylindrical side wall extending from the edge of the bottom. The end cap cover 50 is mounted to the motor with its cylindrical side wall and the end cap 11 forming a chamber to accommodate the PCB 40, the ring magnet 33, etc.

Figure 9:
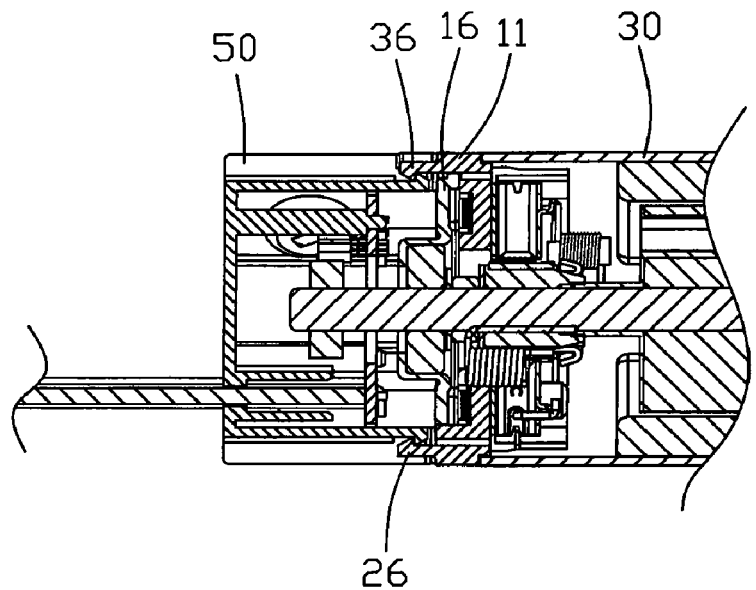
FIG. 9 is a sectional view of the PMDC motor of FIG. 8.
Figure 10:
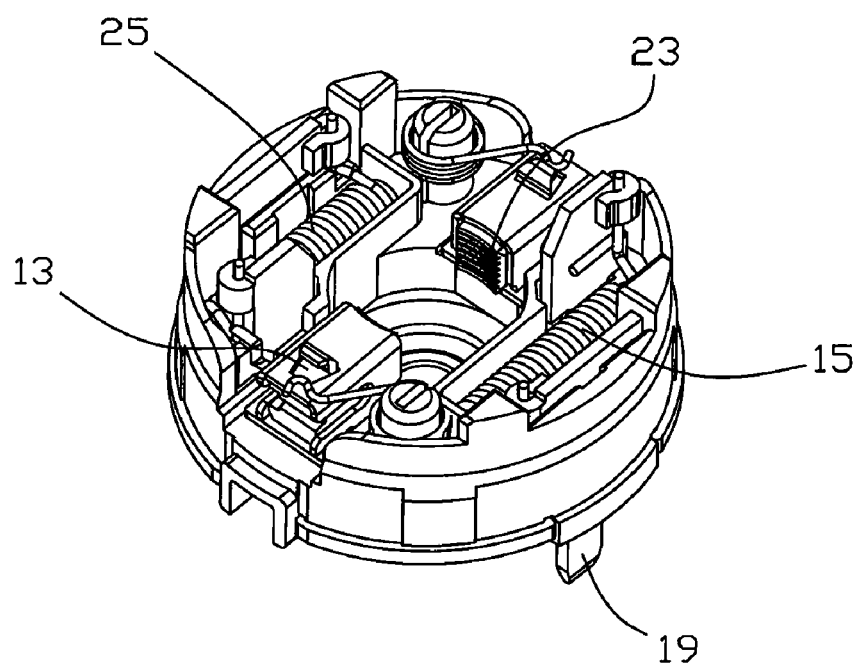
FIG. 10 illustrates an end cap of a prior art PMDC motor.

Referring to FIG. 2, FIG. 7 and FIG. 9, the end cap 11 has a first leg 26 and a second leg 36 for mounting the end cap cover 50. Barbs are formed at distal ends of the legs to engage with anchors 53 and 54 on the end cap cover 50. The motor terminals 19, 29 may extend through the end cap cover to be connected to the power source. Preferably, however, as shown in FIG. 7, two connectors 51, 52, are mounted to the PCB and connect to the terminals. The connectors thus connect the terminals 19,29 to the power leads of the wires via the PCB. Alternatively, the power leads may connect directly to the connectors with the connectors providing the connection between the power leads and the PCB.

Certain embodiments of this invention are particularly suited for use as motors for driving automotive liftgates.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the invention is described with reference to preferred embodiments, it will occur to persons of the art that various modifications are possible. Therefore, the scope of the invention is to be determined only by reference to the claims that follow.

The invention claimed is:

1. A PMDC motor comprising a stator and a rotor rotatably mounted to the stator,
    the stator comprising a housing and an end cap mounted to one end of the housing, the end cap supporting, on an inner surface thereof, a first brush, a second brush, a first terminal, a second terminal, a first choke connected in series with the first brush and the first terminal, a second choke connected in series with the second brush and the second terminal, a set of capacitors electrically connected with the two terminals, and a PTC thermistor connected in series with the second terminal,
    wherein each of the two chokes comprise an inductor core extending axially and a winding wound about the inductor core;
    the rotor comprising a shaft having a first end supported by a bearing held by the end cap; and a ring magnet mounted onto the first end of the shaft;
    wherein a PCB is mounted adjacent to the end cap and at least one Hall sensor is mounted on the PCB and arranged to detect rotation of the ring magnet;
    the motor further comprising an end cap cover which forms a chamber with the end cap, a first leg and a second leg,
    wherein first and second legs are formed on the end cap and extend axially outwards to engage the end cap cover and the PCB is disposed within the chamber.

2. The motor of claim 1, wherein barbs are formed at the distal ends of the first and second legs and anchors are formed on the end cap cover to engage the barbs.

3. The motor of claim 1, wherein the two terminals axially penetrate the end cap and protrude through an outer surface of the end cap, the two terminals and the two legs being arranged alternately in a circumferential direction.

4. The motor of claim 3, further comprising two connectors connected to the PCB and electrically connecting the two terminals to a source of power for the motor.

5. The motor of claim 1, wherein the set of capacitors comprises a first capacitor and a second capacitor, the first capacitor being electrically connected between the first terminal and the stator housing and the second capacitor being electrically connected between the second terminal and the stator housing.

* * * * *